Sept. 21, 1937.　　　　G. T. SOUTHGATE　　　　2,093,821
WELDING AND CUTTING APPARATUS
Filed Dec. 23, 1931
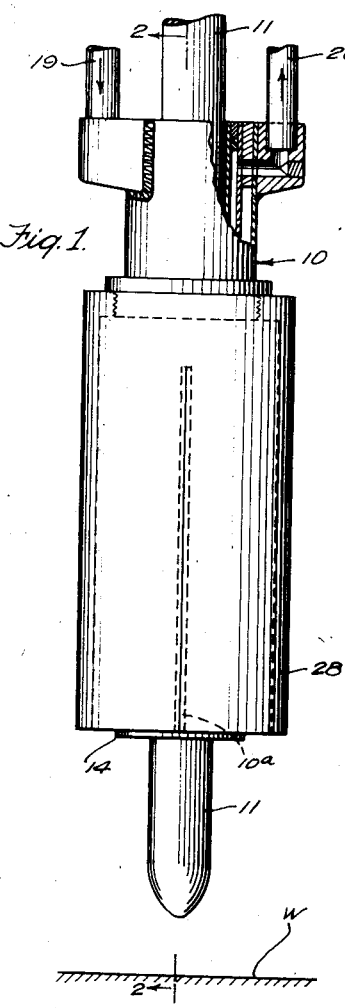
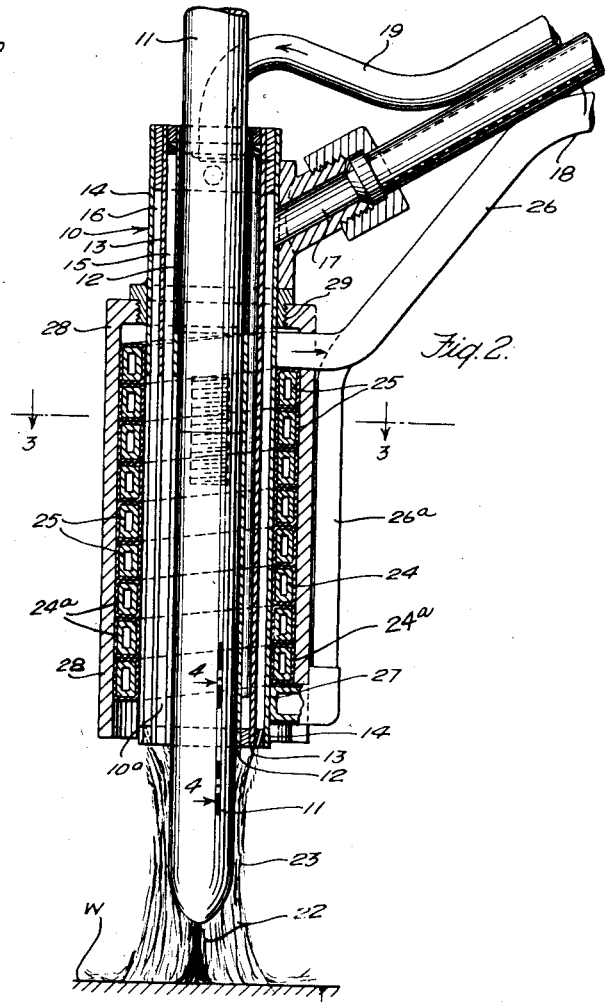
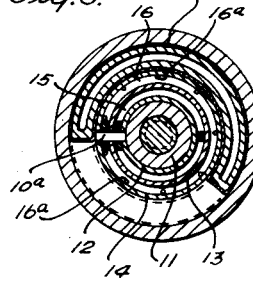
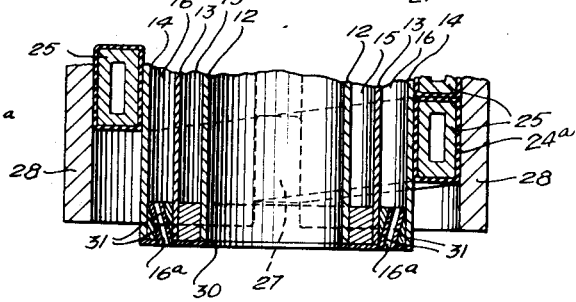
INVENTOR:
George T. Southgate,
BY
ATTORNEYS.

Patented Sept. 21, 1937

2,093,821

UNITED STATES PATENT OFFICE 2,093,821

WELDING AND CUTTING APPARATUS

George T. Southgate, Forest Hills, N. Y., assignor, by mesne assignments, to Union Carbide and Carbon Corporation, a corporation of New York Application December 23, 1931, Serial No. 582,851

6 Claims. (Cl. 158—27.4)

The present invention relates to apparatus for use in welding or cutting metal and particularly to such apparatus, in the use of which, the work in the welding or cutting region is heated wholly or partly by means of an electric arc. The invention has especial application to apparatus of this character for use in pyrelectric welding wherein the heat of the electric arc is supplemented by that from a suitable flame produced by the combustion of gases, and for use in cutting by means of an electric arc as a heating means in cooperation with an oxidizing jet. The term pyrelectric as herein used signifies broadly the use of a flame in conjunction with electricity for heating.

In apparatus of this character, the electrode for producing the arc with the work may be supported for facility in manipulation by a resilient gripping means yieldably and frictionally holding the electrode in various positions of adjustment. The supplementing gaseous flame is fed around the electrode by suitable means so as to envelop the region heated by the electric arc, thereby protecting the welding region against atmospheric gases as nitrogen and oxygen and assisting the electrode in the heating of this region.

In accordance with this invention the welding apparatus may comprise an electrode for providing a welding arc, associated with means for directing an envelope of flame therearound so as to protect the welding puddle against atmospheric influence and so as to assist the arc in heating the welding region, together with means, as a solenoid, for providing a magnetic field so positioned as to act directively upon the arc and maintain it within the protective curtain of the flame and within its metallurgically benefactive region of influence.

The flame directing means may be included in a tubular holder for the electrode, the lower end of which is provided with orifices connecting with a passage for supplying the flame supporting fuel around the electrode. These orifices are in constant danger, when in use, of becoming clogged by particles or droplets of molten metal projected from the welding puddle onto the tip end or nozzle of the torch and of such temperature as to adhere thereto or become fused therewith. This is particularly likely to occur in pyrelectric welding, in the practice of which the temperature of the puddle is substantially at the boiling point of iron which is ordinarily the metal being fused.

It is an important object of the invention, therefore, to provide an improved torch tip or nozzle, having its end, in which are located the orifices for supplying fluid fuel to the welding region, formed of or coated with material resistive to the fusion therewith or adherence thereto of molten metal particles which may impinge thereagainst.

To this end, the tip or nozzle of the electrode holder of a pyrelectric torch around the fuel orifices may consist of or its surface may be coated with a metal, the melting point of which is sufficiently higher than the temperature of the molten metal particles or droplets that may be impinged thereagainst, as to prevent their adherence thereto or fusion therewith. Metals having a melting point above 2000° C., such as tungsten, tantalum, and molybdenum act very well for this purpose, particularly when the metal of the work is iron.

The above and other objects and novel features of the invention will become apparent from the following specification taken with the accompanying drawing in which, Fig. 1 is a view of a welding torch head in front elevation, constructed in accordance with the present invention, parts being broken away;

Fig. 2 is a longitudinal sectional view on line 2—2, Fig. 1, through the head, showing the handle broken away;

Fig. 3 is a cross sectional view on line 3—3 of Fig. 2; and

Fig. 4 is a fragmentary sectional view enlarged as compared with Figs. 1, 2, and 3 and taken on line 4—4 of Fig. 2 longitudinally of the torch showing a coating on the tip or nozzle end of the torch and on the walls of the orifices.

The apparatus as illustrated in the drawing comprises an electrode holder 10 which may be in the nature of a tube longitudinally split as at 10a and adapted to yieldably grip an electrode 11 and hold the same in various positions of axial adjustment. The holder comprises a plurality of co-axial, radially-spaced metallic walls 12, 13 and 14, the wall 12 contacting with and gripping the electrode so as to provide a good electric contact therewith substantially throughout the length of its bore. The space 15 between the walls 12 and 13 may serve as a chamber for the circulation of a cooling fluid, such as water, around the electrode and between the same and a fuel gas passage 16 provided by the spacing of the walls 13 and 14. The passage 16 serves to supply a plurality of jets of combustible gas around the electrode, the jets being so directed by suitably arranged orifices or nozzles 16a that they will afford an enveloping flame around the welding end of the electrode and around the welding region therebeneath to protect the said region against deleterious influences upon the molten metal by atmospheric gases, particularly oxygen and nitrogen. The passage 16 is supplied with gas through a conduit 17 extending through the handle 18, and cooling fluid may be conducted to and from the passage 15 by tubes 19 and 20, the electrode 11 being supplied with current in a manner as will presently appear.

In order to direct the arc 22 from the electrode 11 and keep the same upon the work W and within the region of influence of the flame constituting the protective curtain, as represented at 23, during manipulation of the torch, a solenoid 24 is provided consisting of a suitable number of coils suitably encased in insulating material 24a, the solenoid surrounding the electrode, and preferably also the holder 10, so as to be co-axial with the torch head. The solenoid may be of copper wire or, as shown, in the nature of helically wound metallic tubing 25 arranged in one or more layers and, in case tubing is used, a cooling fluid may be circulated therethrough. Electric current may be led to the upper end of the solenoid from a source (not shown) by a hollow lead 26 serving also as an outlet conduit for the cooling fluid. The electric circuit including the solenoid may be completed through the holder 10 electrically connected to the solenoid at 27, electrode 11, arc 22, work W, and a conductor 21 leading therefrom back to the source of electricity, the solenoid and electrode being of course connected in series. A suitable conduit 26a of insulating material may be provided connected to the lower end of the solenoid for supplying cool fluid to the solenoid at the point of greatest heat. It will be understood that the electrode and solenoid may, as an alternative, be connected in parallel, and direct or alternating current may be used in either or both the arc and solenoid, but usually direct current is used in both.

In using a solenoid with a torch in the above manner, the tubular walls of the holder 10 are preferably made of steel, stainless alloy steel, or other ferro-magnetic material, and a protective covering or shell 28 which is also preferably made of ferro-magnetic material may be provided. The holder serves as a core for the solenoid, being joined to the shell at the rear end as by a threaded connection 29, the solenoid 25 lying between shell and core.

Referring particularly to Fig. 4, of the drawing, it will be noted that the lower end of the holder 10 and the surfaces of the nozzles or orifices 16a are coated as by plating with thin metallic layers 30 and 31 respectively. The coating 30 is preferably of tungsten, the melting point of which is quite high (i. e. 3400° C.) and greater than the boiling point of iron (which is the most usual metal operated upon) by about 950° C., the boiling point of iron being at about 2450° C. at which temperature it may be assumed the particles are projected from the puddle in pyrelectric welding. The particles therefore probably contact with the surface of the nozzle at about 2000° C., which is sufficiently under the melting point of tungsten to prevent fusion or adherence of the particles thereto. Other metals may be used in place of tungsten, the melting points of which are sufficiently above 2000° C. to prevent adherence or fusion of the molten droplets therewith, as for example tantalum (melting point 2900° C.) or molybdenum (melting point 2535° C.).

Preferably the walls of the orifices 16a are coated with platinum since it is inert to iron and iron oxide, is easily formed into capillary tubes of a diameter to fit in the orifices and since it plates easily. The melting point of platinum is around 1755° C. which is lower than the temperature assumed for the metallic droplets. However, adherence of particles thereto will be unlikely since the metal, so located, will be less subject to heating influences of the welding region and heating thereof will be materially resisted by the flow of fuel through the orifices. While the brightness, smoothness and resistance to oxidation of such metals as named for coating tend to keep the surfaces of the nose and orifices clean, it is also of the greatest importance to provide, to this end, a surface infusible at the temperature at which the particles or droplets impinge thereagainst.

While the heat resisting metals are herein described as a coating, it is obvious that the whole or a large part of the nozzle or tip of the torch may be constructed of one of these metals. It is also within the purview of the invention to coat both the nozzle and the surface and orifice walls with platinum or any one of the other metals named and that such coating may be used with torches other than the pyrelectric type.

In employing the torch, as in welding or cutting, the same is moved over the work in the usual manner after an arc has been struck between the electrode and the work and the fuel curtain has been lit. The electromagnetic field serves, the while, to direct the arc and to maintain the same within the region of heat influence of the gas flame so that the puddle or crater at the work end of the arc will lie at all times within the protective curtain of the flame and within the metallurgical benefactive region of influence of the torch.

The steadying influence of the magnetic flux and its influence to keep the arc within the gaseous envelope tends to keep the rate of heating uniform and, as a consequence, that of melting of the metal and the cooling thereof and prevents formation of laps, cold shuts and other deformities and residual stresses incident to arc breaking and contact restarting. In employing the torch for cutting, an oxidizing gas is substituted for the heating gas and heating of the work is accomplished by the arc and, in either cutting or welding, the action of the coating 30, 31 to protect the nozzle or tip of the torch against adherence of particles thereto is, of course, the same.

I claim:

1. A torch tip which consists of metal having a polished surface of high heat resistance.

2. A torch tip having a surface of tungsten and orifices for feeding fuel through said surface, the walls of said orifices being coated with platinum.

3. A torch tip having a surface resistive to fusion at a temperature of at least 1755° C., which surface is polished whereby adherence of molten metallic particles thereto is resisted.

4. A torch tip having orifices for feeding fuel through said tip, the inner surfaces of said orifices being of platinum.

5. A torch tip having an outer surface of platinum and orifices for feeding fuel through said surface, the inner surfaces of said orifices being of platinum.

6. A torch tip having an outer surface of metal resistive to fusion at a temperature of at least 2000° C., and orifices for feeding fuel through said surface, the inner surface of said orifices being of platinum.

GEORGE T. SOUTHGATE.